United States Patent [19]
Takeuchi et al.

[11] Patent Number: 6,117,595
[45] Date of Patent: Sep. 12, 2000

[54] HIGH SODIUM ION CONDUCTING INORGANIC COMPOSITE SOLID ELECTROLYTE AND METHOD FOR PRODUCTION THEREOF

[75] Inventors: Tomonari Takeuchi, Osaka, Japan; Elisabeth Bétourné, Amiens, France; Mitsuharu Tabuchi, Osaka, Japan; Osamu Nakamura, Osaka, Japan; Hiroyuki Kageyama, Osaka, Japan

[73] Assignee: Agency of Industrial Science & Technology and Ministry of International Trade & Industry, Tokyo, Japan

[21] Appl. No.: 09/018,621

[22] Filed: Feb. 4, 1998

[30] Foreign Application Priority Data

Feb. 25, 1997 [JP] Japan .................. 9-058420

[51] Int. Cl.[7] ........................... H01M 6/18
[52] U.S. Cl. ................ 429/321; 429/304; 429/305
[58] Field of Search ................ 429/304, 321, 429/305

[56] References Cited

U.S. PATENT DOCUMENTS 4,833,048  5/1989  Dejonghe et al. ............ 429/104
5,169,619  12/1992  Yoshimoto et al. ............ 423/610

OTHER PUBLICATIONS

Y. Saito, et al., "Ionic Conductivity Enhancement of $Na_4Zr_2Si_3O_{12}$ by Dispersed Ferroelectric PZT", Mat. Res. Bull., vol. 23, 1988, pp. 1661–1665, No month in date, month unknown.

Saito et al., "Ionic Conductivity Enhancement of Na4Zr2Si3O12 by Dispersed Ferroelectric PZT", Mat. Res. Bull., vol. 23, 1988 (month unknown), pp. 1661–1665, 1988 No Month.

Shimazu et al., "Electrical Conductivity and Ti4+ Ion Substitution Range in NASICON System", Solid State Ionics, vol. 79, 1995 (month unavailable), pp. 106–110, 1995, No Month.

Nakamura et al., "Titanium Ion Substitution Ranges For Zirconium Ion in the Na1 + xZr2SixP3–xO12 System", vol. 89, 1996, pp. 159–164, 1996, No Month.

*Primary Examiner*—Maria Nuzzolillo
*Assistant Examiner*—Jennifer O'Malley
*Attorney, Agent, or Firm*—Oblon, Spivak, McClelland, Maier & Neustadt, P.C.

[57] ABSTRACT

A high sodium ion conducting inorganic composite solid electrolyte obtained by mixing $Na_4Zr_2Si_3O_{12}$ with titanium oxide and sintering the resultant mixture and a method for the production of a high sodium ion conducting inorganic composite solid electrolyte, consisting essentially of the steps of mixing $Na_4Zr_2Si_3O_{12}$ with titanium oxide and sintering the resultant mixture.

12 Claims, 3 Drawing Sheets

HIGH SODIUM ION CONDUCTING INORGANIC COMPOSITE SOLID ELECTROLYTE AND METHOD FOR PRODUCTION THEREOF

BACKGROUND OF THE INVENTION

1. Field of the Invention

This invention relates to a high sodium ion conducting inorganic composite solid electrolyte and a method for the production thereof, and more particularly to a high sodium ion conducting inorganic composite solid electrolyte for use as a solid electrolyte for a sodium/sulfur storage battery and a method for the production thereof.

2. Description of the Prior Art

The lead-acid battery is the type most popularly used as a secondary battery. Since the sodium/sulfur storage battery has a far larger energy density than the lead storage battery (4.7 times that of the lead storage battery), the development thereof for power storage or as a power source for driving an electric automobile is urgently desired.

Heretofore, the use of β-alumina ($Na_2O11Al_2O_3$) as a solid electrolyte for the sodium/sulfur storage battery has prevailed because this storage battery requires a solid electrolyte with high ion conductivity. The polycrystal of β-alumina exhibits a high conductivity in the range of $3 \times 10^{-4} - 5 \times 10^{-4}$ S/cm at room temperature (25° C.). However, it has the disadvantages of offering low chemical stability to water, requiring a high temperature exceeding 1600° C. for synthesis, and being difficult to manufacture as a sinter without cracks.

Thus, the development of a material free of these defects and suitable as the solid electrolyte of the sodium/sulfur storage battery has been desired. $Na_{1+x}Zr_2P_{3-x}Si_xO_{12}$ ($0 \leq x \leq 3$) is counted among the alternatives to β-alumina as a material having sodium ion conductivity. Though this material shows maximum conductivity ($10^{-3}$ S/cm at room temperature) when the composition thereof has 2 for x, it contains a phosphate ($PO_4$) group and, therefore, reacts readily with fused sodium which is one of the electrode materials of the sodium/sulfur storage battery.

$Na_4Zr_2Si_3O_{12}$ (NZS), which has 3 for x and lacks the moiety $PO_4$ of the material mentioned above, exhibits chemical stability to fused sodium and is a material with practical potential. Since this material has notably low conductivity ($10^{-6}$ to $10^{-7}$ S/cm at room temperature) as compared with β-alumina, however, it cannot be used in its unmodified form as a solid electrolyte for the sodium/sulfur storage battery.

The present inventors therefore pursued a study to find a means for enabling the NZS to retain its chemical stability and serve as a fully effective solid electrolyte for the sodium/sulfur storage battery. They consequently ascertained that a composite of NZS with titanium oxide acquires high conductivity without the loss of the chemical stability of the NZS. The present invention was accomplished as a result.

SUMMARY OF THE INVENTION

This invention specifically concerns a high sodium ion conducting inorganic composite solid electrolyte obtained by mixing $Na_4Zr_2Si_3O_{12}$ with titanium oxide and sintering the resultant mixture and a method for the production of a high sodium ion conducting inorganic composite solid electrolyte, which consists essentially of mixing $Na_4Zr_2Si_3O_{12}$ with titanium oxide and sintering the resultant mixture.

DESCRIPTION OF THE PREFERRED EMBODIMENTS

Figure 1:
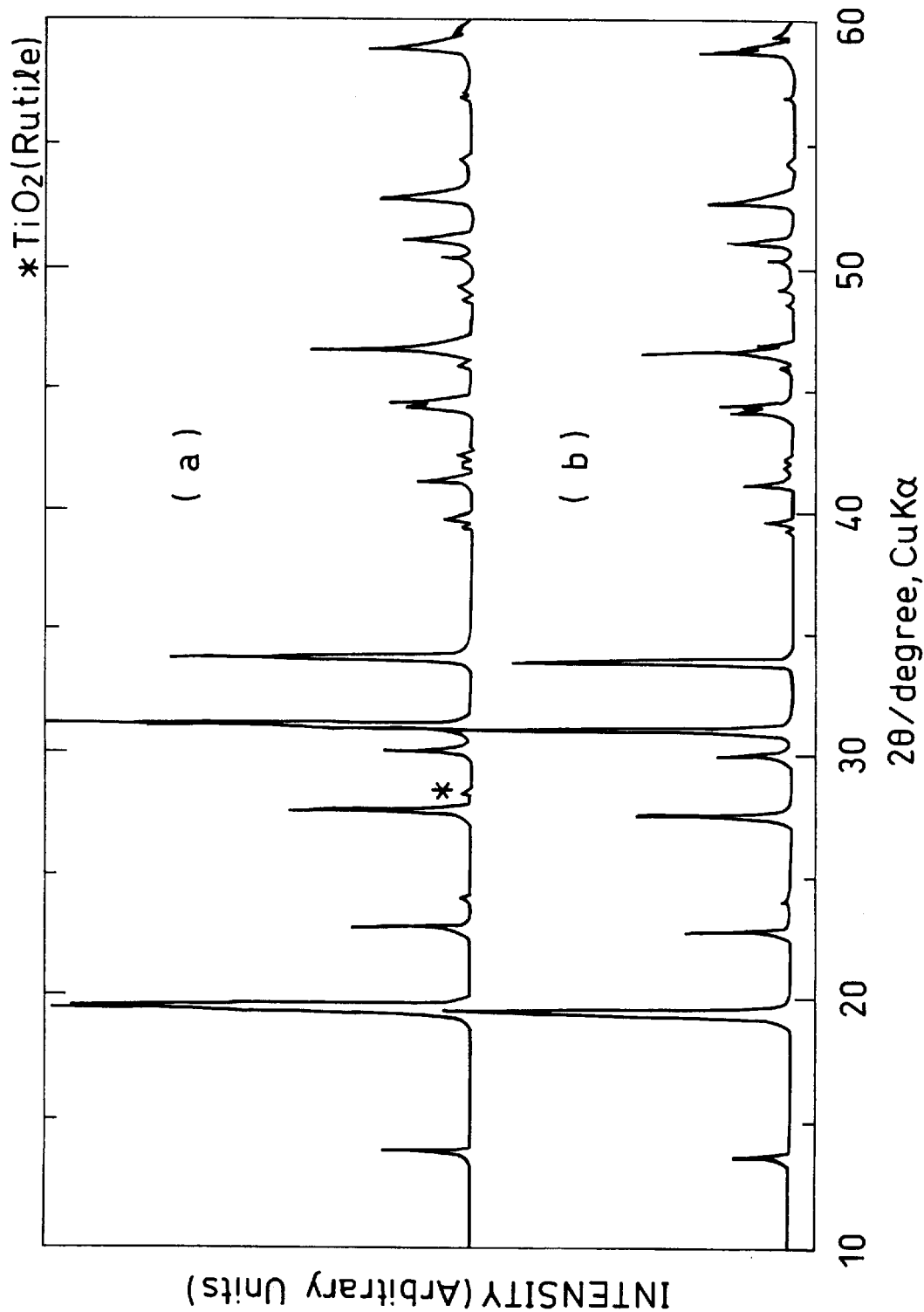
FIG. 1(a) is an X-ray diffraction pattern of a conducting inorganic composite solid electrolyte of this invention having a $TiO_2$ content of 20 mol %.
FIG. 1(b) is an X-ray diffraction pattern of NZS.

The amount of titanium oxide mixed with $Na_4Zr_2Si_3O_{12}$ is in the range of 1–50 mol %, preferably 5–30 mol %, based on the total amount of $Na_4Zr_2Si_3O_{12}$ and titanium oxide. When the amount of titanium oxide falls short of 1 mol %, the conductivity of the sinter of the mixture is substantially the same as that of the $Na_4Zr_2Si_3O_{12}$. When this amount exceeds 50 mol %, the conductivity of the sinter thereof is equal to or lower than that of the $Na_4Zr_2Si_3O_{12}$. The sinter attains the highest conductivity when the amount of titanium oxide is 20 mol %. A clear increase of the conductivity by at least one order of ten is observed when the amount of titanium oxide is in the range of 5–30 mol %. For this reason, the amount of titanium oxide is particularly preferred to be in the range of 5–30 mol %.

The sintering temperature is retained at a level in the range of 1000–1500° C. When this temperature falls short of 1000° C., the sinter obtained does not exhibit the characteristics aimed at by this invention. When the temperature exceeds 1500° C., the NZS gives rise to an impurity and fails to acquire the composition aimed at. In the high sodium ion conducting inorganic composite solid electrolyte of the present invention, the NZS constitutes a matrix and the titanium oxide as a dispersed phase.

The NZS will now be described.

The NZS used herein is a well-known sodium ion conductor, i.e. a substance with a crystal structure which has a markedly large number of sites available for occupation by ions as compared with the number of mobile ions. It can be prepared by such methods of synthesis as the solid-state reaction method, the hydrolysis method, and the sol-gel method. Particularly, it is preferred to be produced by the sol-gel method or solid-state reaction method using $Na_2SiO_3$, $ZrO(NO_3)_2$, and $SiO_2$ as the starting materials.

The sol-gel method is described by Yuria Saito, Takashi Asai, Kazuaki Ado, and Osamu Nakamura in Material Research Bulletin, Vol. 23 (1988), 1661–1665.

The procedure for preparing the NZS by the sol-gel method will be described. When the aqueous solutions of the starting materials, $Na_2SiO_3$ and $ZrO(NO_3)_2 \cdot 2H_2O$ (used in concentrations both falling in the range of 0.05–5.0 M, preferably 0.1–0.5 M), are mixed, they give rise to a white precipitate. The mixture producing this white precipitate is meanwhile stirred and heated at a temperature in the range of 80–90° C. for a period of about two hours to evaporate the water to about one half of the original volume. Then, the resultant gelled precipitate is thermally dehydrated in an oven at 100° C. until it becomes a sol. The sol is added with $SiO_2$ powder until the stoichiometric ratio of the NZS (Zr/Si atomic ratio=2/3) is reached. The produced mixture is further mixed thoroughly and then left standing overnight in an oven at 100° C. until it is thoroughly dried. The sample obtained consequently is pulverized in a mortar for not less than about 15 minutes and sintered at 1100° C. for two hours. The NZS aimed at can be obtained by performing this sintering treatment up to three repetitions.

The titanium oxide mixed with the NZS herein can be prepared by calcining titanium hydroxide (TiO$_2$·2H$_2$O), derived from, for example, titanium tetrachloride or titanyl sulfate (TiOSO$_4$).

The amounts of the titanium oxide, commercially available or prepared by the method described above, and the NZS to be mixed herein are as stated above. Then, the high sodium ion conducting solid electrolyte is produced by mixing the titanium oxide and NZS, molding the mixture in the form of tablets, and thereafter sintering it under normal pressure at an elevated temperature. The sintering can be performed in the open air at a temperature in the approximate range of 1000° C.–1500° C., preferably 1100° C.–1300° C.

The conductivity of the high sodium ion conducting inorganic composite solid electrolyte according to this invention is shown in the working example set out below. It has been demonstrated to fall in the range of $10^{-3}$–$10^{-6}$ S/cm at 50° C.

EXAMPLE

One example of forming a composite of NZS with TiO$_2$ will now be explained to further clarify the characteristics of the present invention. (Synthesis of NZS particles)

The NZS was prepared by the sol-gel method mentioned above. The aqueous solution of Na$_2$SiO$_3$ and the aqueous solution of ZrO(NO$_3$)$_2$ were produced both in an equal concentration of 0.3M. (Synthesis of composite solid electrolyte, NZS/TiO$_2$)

To the NZS prepared by the sol-gel method, a commercially available rutile type TiO$_2$ powder was added in amounts so calculated as give the resultant mixtures TiO$_2$ contents of 10, 20, and 30 mol %. Then, each of the resultant mixtures was mixed in a mortar for a period of not less than about 15 minutes and molded in the form of tablets, 1 cm in diameter and 1 mm in thickness. The tablets were sintered at 1200° C. for two hours to obtain a composite type solid electrolyte, NZS/TiO$_2$. (Evaluation of composite solid electrolyte NZS/TiO$_2$)

The X-ray diffraction patterns of the sinter having a TiO$_2$ content of 20 mol % and the NZS in its simple form are respectively shown in FIGS. 1(a) and (b).

The lattice constants of the sample having a TiO$_2$ content of 20 mol % were a=9.1841(5) [indicating 9.1841±0.0005; similar notation being adopted hereinafter] and c=22.197(3) Angstroms and those of the NZS in the simple form were a=9.1876(9) and c=22.189(4) Å. The comparison of these numerical values reveals differences which falL in the ranges of experimental errors. This means that substantially no difference was found. These results indicate that the composites are the mixtures of NZS and TiO$_2$, not the solid solutions. The sinter density was 3.2 c/cm$^3$ in the case of the sample having a TiO$_2$ content of 20 mol % and 2.5 g/cm$^3$ in the case of the sample of NZS in the simple form. This fact clearly indicates that the addition of TiO$_2$ resulted in an increase in density.

Figure 2:
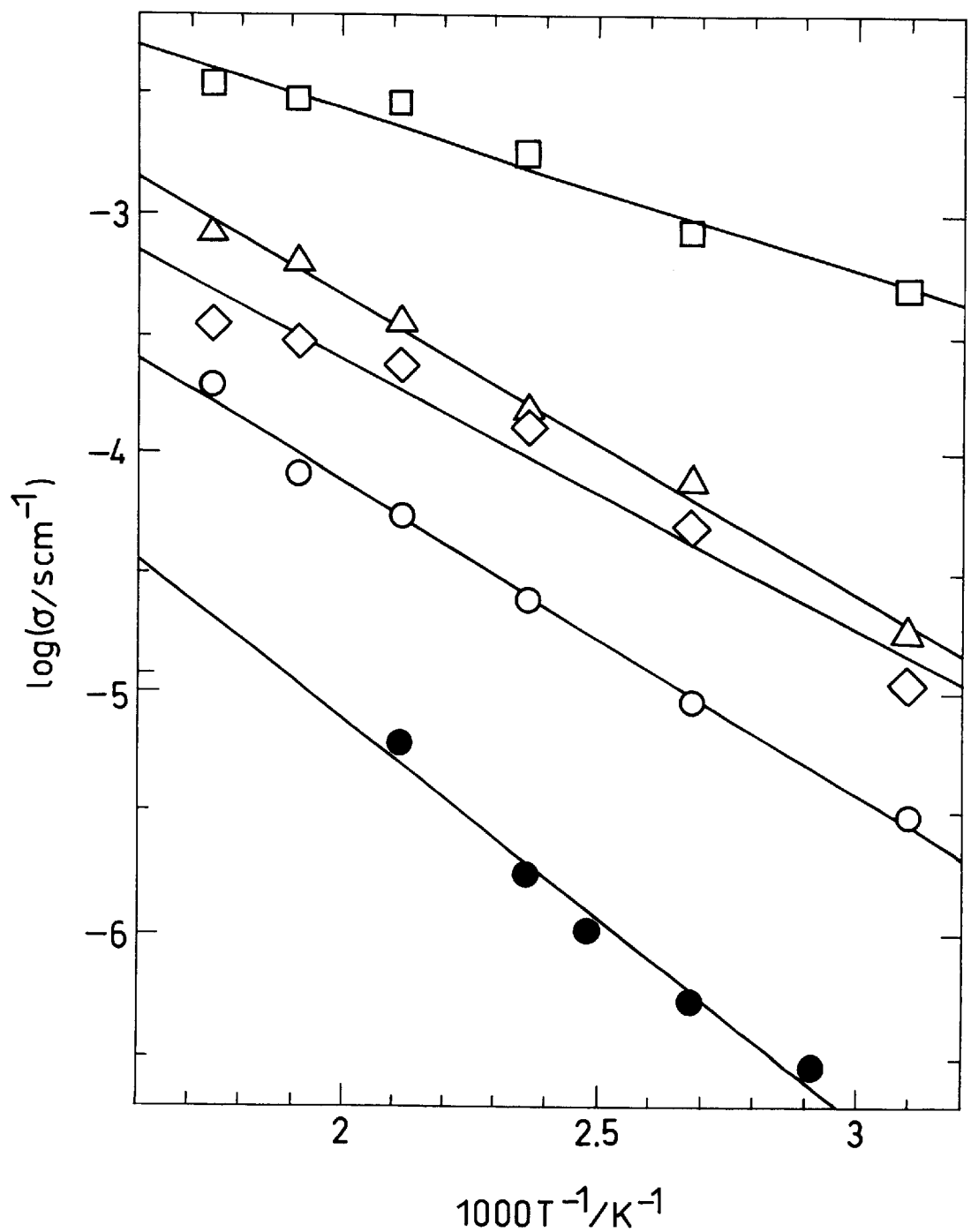
FIG. 2 is a diagram showing how conductivity varies with temperature in conducting inorganic composite solid electrolytes of this invention and NZS.

The conductivity data obtained of the sample of NZS in the simple form and the samples of the inorganic composite solids of this invention are shown in FIG. 2. In this diagram, ●: the sample of 100 mol % of NZS
○: the sample of 95 mol % of NZS and 5 mol % of TiO$_2$
△: the sample of 90 mol % of NZS and 10 mol % of TiO$_2$
□: the sample of 80 mol % of NZS and 20 mol % of TiO$_2$
◇: the sample of 70 mol % of NZS and 30 mol % of TiO$_2$ The samples of composite solid electrolyte having added TiO$_2$ invariably showed increases in conductivity as compared with the sample formed of NZS in the simple form. The degree of increase in conductivity varied with the TiO$_2$ content. In the case of the sample having a TiO$_2$ content of 20 mol %, the density was 4.9×10$^{-4}$ S/cm at room temperature and 2.8×10$^{-3}$ S/cm at 200° C., indicating an e nhancement by about three orders of ten as compared with that of the NZS in the simple form (1.2×10$^{-7}$ S/cm at room temperature and 6.1×10$^{-6}$ S/cm at 200° C.). The activation energy was 13 kJ/mol in the case of the sample having a TiO$_2$ content of 20 mol %, indicating a decrease as compared with that of the sample of the NZS in the simple form (32 kJ/mol).

Figure 3:
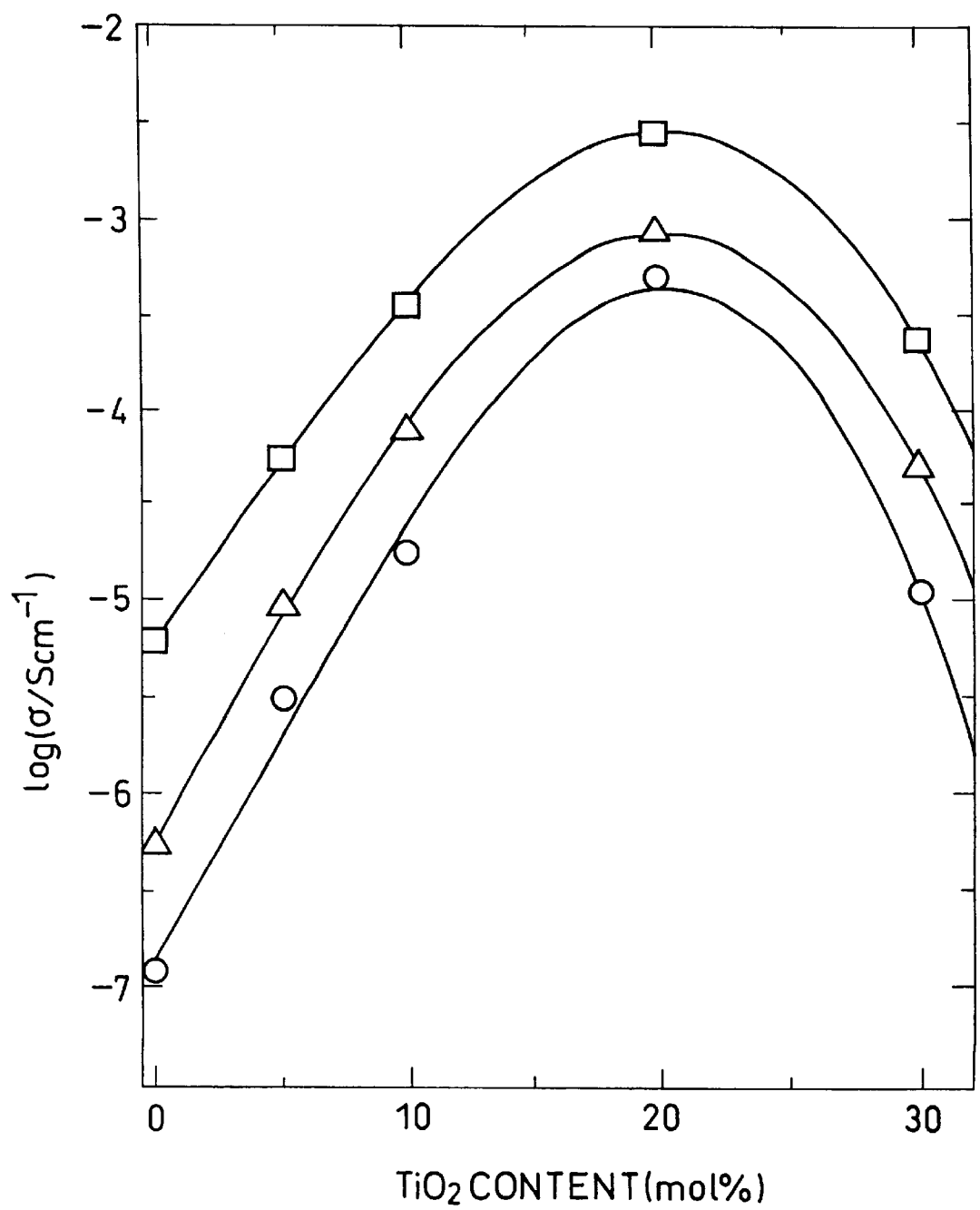
FIG. 3 is a diagram showing how the conductivity of the conducting inorganic composite solid electrolyte of this invention varies with $TiO_2$ content at 50° C., 100° C., and 200° C.

FIG. 3 shows how conductivity varied as a function of TiO$_2$ content at 50° C., 100° C., and 200° C. In this diagram, the open circles (○) indicate the data obtained at 50° C., the open triangles (△) the data obtained at 100° C., and the open squares (□) the data obtained at 200° C. It is clearly seen from the diagram that the addition of TiO$_2$ resulted in an increase in conductivity, that the addition of 20 mol % of TiO$_2$ brought about the largest increase in conductivity by about three orders of ten, and that a further addition to the TiO$_2$ content lowered the increase of the conductivity. The magnitude of electron conduction, estimated by measuring the DC conductivity, for the sample having a TiO$_2$ content of 20 mol % was 1.1×10$^{-6}$ S/cm at room temperature, indicating that the contribution of electron conduction was about 0.2%; of the total conduction (4.9×10$^{-4}$ S/cm) and that this increase in conductivity was ascribable to an increase of the ion conductivity. Thus, the composite of this invention having a TiO$_2$ content of 20 mol % is possessed of high ion conductivity comparable with that of β-alumina.

The results given above demonstrate that this invention enables a sodium ion conductor keeping chemical stability and manifesting high conductivity to be easily produced and promotes the application of this conductor to the secondary battery which is represented by a sodium/sulfur storage battery using an inorganic solid electrolyte.

What is claimed is:

1. A high sodium ion conducting inorganic composite solid electrolyte obtained by mixing N$_4$Zr$_2$Si$_3$O$_{12}$ with titanium oxide and sintering the resultant mixture, wherein the amount of said titanium oxide mixed with said Na$_4$Zr$_2$Si$_3$O$_{12}$ is in the range of 1–50 mol %, based on the total amount of said Na$_4$Zr$_2$Si$_3$O$_{12}$ and said titanium oxide.

2. A high sodium ion conducting inorganic composite solid electrolyte according to claim 1, wherein the sintering temperature is in the range of 1000–1500° C.

3. A high sodium ion conducting inorganic composite solid electrolyte according to claim 1, wherein the ion conductivity is in the range of $10^{-3}$–$10^{-6}$ S/cm at 50° C.

4. A high sodium ion conducting inorganic composite solid electrolyte according to claim 1, wherein said Na$_4$Zr$_2$Si$_3$O$_{12}$ is obtained by one method selected from the group consisting of the sol-gel method and the solid-state reaction method using Na$_2$SiO$_3$, ZrO(NO$_3$)$_2$, and SiO$_2$ as the starting raw materials.

5. A high sodium ion conducting inorganic composite solid electrolyte according to claim 1, wherein said titanium oxide is obtained by sintering titanium hydroxide.

6. A high sodium ion conducting inorganic composite solid electrolyte according to claim 1, wherein said $Na_4Zr_2Si_3O_{12}$ is a matrix and said titanium oxide is dispersed in said matrix.

7. A method for the production of a high sodium ion conducting inorganic composite solid electrolyte, consisting essentially of the steps of mixing $Na_4Zr_2Si_3O_{12}$ with titanium oxide and sintering the resultant mixture.

8. A method according to claim 7, wherein the amount of said titanium oxide to be mixed with said $Na_4Zr_2Si_3O_{12}$ is in the range of 1–50 mol %, based on the total amount of said $Na_4Zr_2Si_3O_{12}$ and said titanium oxide.

9. A method according to claim 7, wherein the sintering temperature is in the range of 1000–1500° C.

10. A method according to claim 7, wherein the ion conductivity is in the range of $10^{-3}$–$10^{-6}$ S/cm at 50° C.

11. A method according to claim 7, wherein said $Na_4Zr_2Si_3O_{12}$ is obtained by one method selected from the group consisting of the sol-gel method and the solid-state reaction method using $Na_2SiO_3$, $ZrO(NO_3)_2$, and $SiO_2$ as the starting raw materials.

12. A method according to claim 7, wherein said titanium oxide is obtained by sintering titanium hydroxide.

* * * * *

UNITED STATES PATENT AND TRADEMARK OFFICE
CERTIFICATE OF CORRECTION

PATENT NO. : 6,117,595

DATED : September 12, 2000

INVENTOR(S): Tomonari TAKEUCHI, et al.

It is certified that an error appears in the above-identified patent and that said Letters Patent is hereby corrected as shown below:

On the Title Page, Item [73] the Assignee is incorrect. Item [73] should read as follows:

[73]    Assignee:    Agency of Industrial Science & Technology, Ministry of International Trade & Industry, Tokyo, Japan Signed and Sealed this First Day of May, 2001

Attest:

NICHOLAS P. GODICI

*Attesting Officer*    *Acting Director of the United States Patent and Trademark Office*